(No Model.)
L. M. DODDRIDGE.
VEHICLE AXLE.
No. 427,466. Patented May 6, 1890.
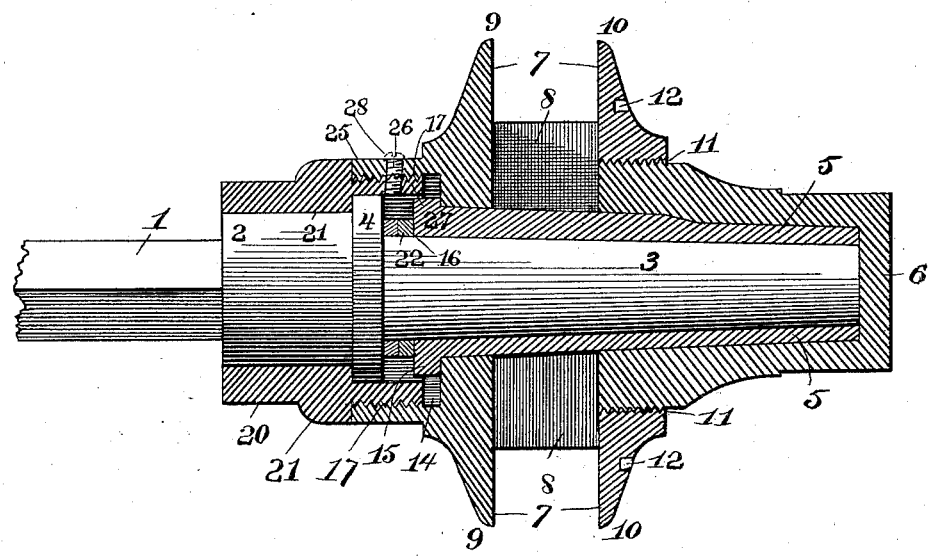
Witnesses:
J. B. McGirr.
N. J. Bernhard
Inventor:
Loyal M. Doddridge
By his Attorneys
Edson Bros.

UNITED STATES PATENT OFFICE.

LOYAL M. DODDRIDGE, OF STANTON, MICHIGAN, ASSIGNOR OF ONE-HALF TO FRANKLIN H. FRENCH, OF SAME PLACE.

VEHICLE-AXLE.

SPECIFICATION forming part of Letters Patent No. 427,466, dated May 6, 1890.

Application filed January 23, 1890. Serial No. 337,820. (No model.)

*To all whom it may concern:*

Be it known that I, LOYAL M. DODDRIDGE, a citizen of the United States, residing at Stanton, in the county of Montcalm and State of Michigan, have invented certain new and useful Improvements in Axles; and I do hereby declare the following to be a full, clear, and exact description of the invention, such as will enable others skilled in the art to which it appertains to make and use the same.

My invention relates to improvements in axles for carriages and wagons; and the object of the invention is to provide a simple and inexpensive axle of peculiar construction adapted for containing or confining a lubricant within the box, and to effectually exclude sand, &c., from said box.

With these and other ends in view my invention consists in the combination of devices and peculiar construction and arrangement of parts, as will be hereinafter fully described and claimed.

To enable others to understand my invention, I will now proceed to a detailed description thereof in connection with the accompanying drawing, in which—

The figure illustrates a longitudinal central sectional view of an axle and hub embodying my invention.

The numeral 1 designates an axle having a skein 2 and a spindle 3 formed integral therewith, the skein being provided at its outer end with a projecting annular flange or rim 4, as shown. The thimble 5 is fitted snugly on the spindle of the axle, and the outer end of the thimble is closed, as at 6, to prevent sand and other matter from entering the thimble. The hub 7 has its sockets 8 made or cast integral with the thimble, at a suitable point thereon, and the clamping rings or bands 9 10 of the hub are arranged on opposite sides of the sockets 8 thereof, so as to bind against the lateral faces of the spokes which are fitted within the sockets. One of these clamping rings or bands (the inner 9) is made integral with the thimble; but the other ring or band 10 is made detachable from the hub and is united to the thimble by a screw-joint 11, whereby the removable ring or band may be screwed up tightly against the spokes to confine the same in place.

The outer exposed face of the outer clamping ring or band 10 is provided with depressions or sockets 12, to receive the extremities of a pair of tongs or other suitable implement to enable a firm grip to be secured on the clamping or binding ring 10, in order to screw the same up tightly or remove it from the hub.

The inner end of the thimble is provided with an enlarged chamber 14, and in this chamber is arranged an annular rim or face 15, of less diameter than the chamber 14, and surrounding the bearing or opening 16 in the thimble for the axle-spindle.

The inner surface of the wall of the chamber 14 is threaded at 17 to receive a corresponding external thread on a nut 20, which is screwed into the inner end of the thimble, and which operates to couple the thimble to the axle and at the same time permit the thimble and hub to rotate freely on the axle-skein and hold said parts against endwise displacement thereon. This confining-nut 20 is provided with an internal collar 21, which impinges or rides against the annular flange or rim 4 of the axle-skein.

Between the rim or face 15 within the chamber 14 of the thimble and the end of the axle-skein are interposed elastic washers 22, as shown.

The thimble fits over and incloses the axle-spindle, and the enlarged chamber thereof incloses the projecting rim or flange of the skein, and the nut fits over the skein and is screwed into the internally-threaded part of the chamber to inclose the skein, and its flange 21 bears against the annular flange 4 of the axle-skein, whereby the thimble and nut are coupled securely together, the parts are prevented from becoming displaced on the axle, and they are free to rotate on the axle.

The inner binding or clamping ring 9 of the hub is formed with a flange 25, which has a vertical opening 26, and the threaded part of the nut is also provided with an opening 27, which is adapted to align with the opening 26 when the nut is properly coupled to the thimble. These aligned openings provide for the ready and easy introduction of a lubricant into the thimble or axle-box, and the lubricant is retained in the box by means of a thumb-screw 28, which works in threads formed in the walls of the aligned openings 26 27. It will thus be seen that I provide an improved axle of simple and inexpensive construction which excludes dirt, sand, and other foreign substances, enables the ready introduction of a lubricant therein, and retains the lubricant within the same.

The operation and advantages of my invention will be readily understood and appreciated by those skilled in the art to which it relates from the foregoing description, taken in connection with the drawing.

Slight changes in the form and proportion of parts may be made without departing from the spirit or sacrificing the advantages of my invention.

I am aware that it is not new to provide a hub with a transverse oil-filling passage which extends through the solid part of the hub, and I am also aware that an axle has been provided with a longitudinal oil-passage which has a lateral branch to feed oil to the hub, and is adapted to receive the lubricant through an aperture in the outer end of the thimble, said aperture being closed by a screw which fits and terminates within the aperture.

Having thus fully described my invention, what I claim as new, and desire to secure by Letters Patent, is—

1. The combination of an axle having its skein provided with the rim or flange 4, a thimble fitted on the spindle of the axle and provided at its inner end with an enlarged threaded chamber which extends inward to inclose the rim or flange 4, a nut which bears against said rim or flange and screwed into the threaded chamber 14, said nut bearing against the edge or periphery and one face of the rim or flange 4, and the thimble bearing against the opposite face of said rim or flange, said thimble having the sockets 8 and the clamping-ring 9 made integral therewith, and the removable clamping-ring 10, secured thereon by a screw-joint, substantially as described.

2. The combination of an axle having its skein provided with an annular rim or flange 4, a thimble fitted on the axle-spindle and provided at its inner end with an enlarged internally-threaded chamber 14, which incloses said annular flange 4, and the nut screwed into the threaded chamber and bearing against the edge and one face of the annular flange 4, the packing 22 being interposed between the other face of the annular flange and the shoulder 16 on the reduced part of the thimble, said nut and the flange 25 of the thimble having the aligned threaded openings for the introduction of a lubricant into the axle-box and receiving a removable thumb-screw 26, as and for the purpose described.

In testimony whereof I affix my signature in presence of two witnesses.

LOYAL M. DODDRIDGE.

Witnesses:
  T. N. STEVENS,
  D. A. TOWLE.